No. 768,740. Patented August 30, 1904.

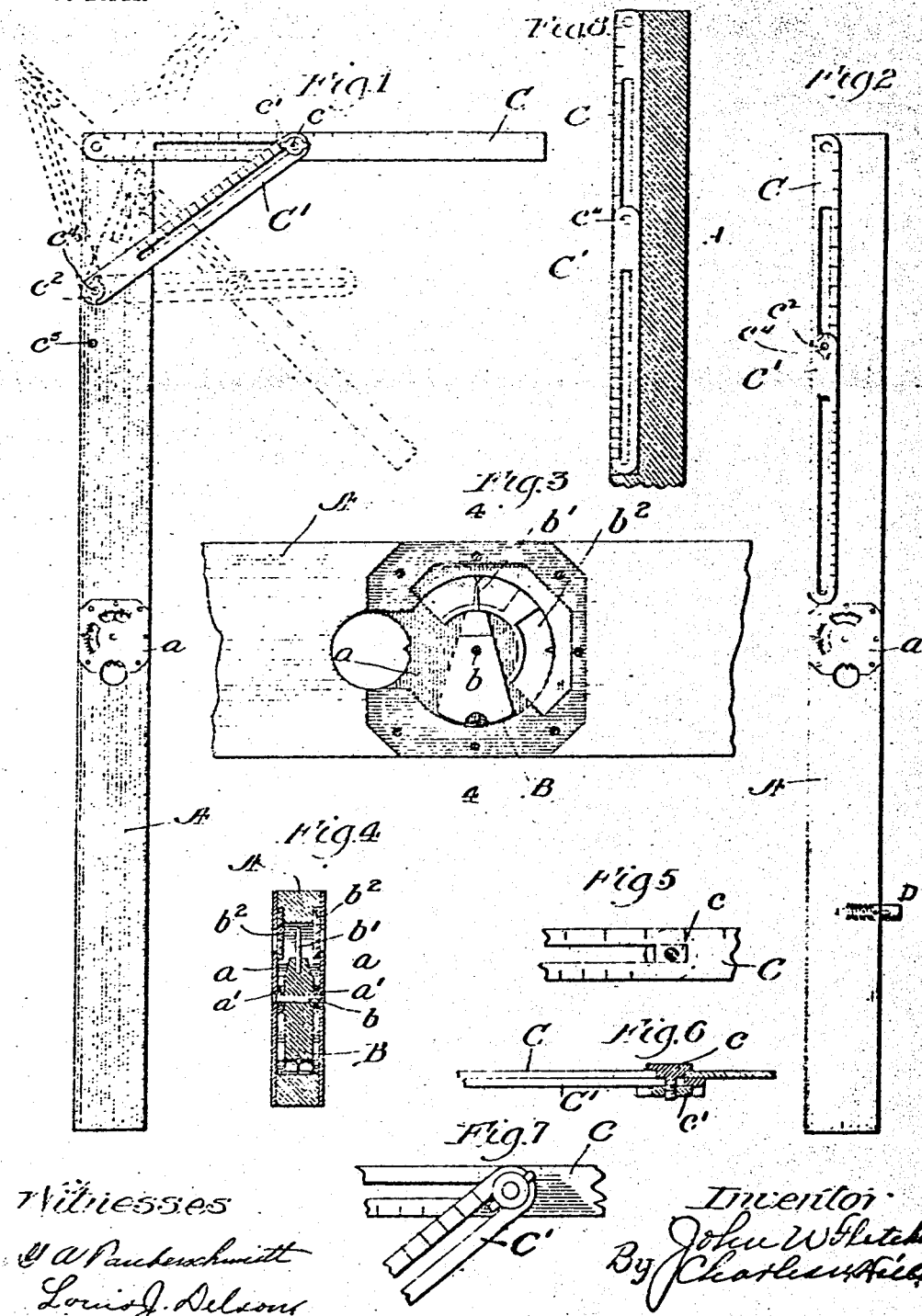

UNITED STATES PATENT OFFICE.

JOHN W. FLETCHER, OF CHICAGO, ILLINOIS, ASSIGNOR OF ONE-HALF TO NAFTALY NEWMAN, OF CHICAGO, ILLINOIS.

COMBINED SQUARE, BEVEL, LEVELING AND PLUMBING INSTRUMENT.

SPECIFICATION forming part of Letters Patent No. 768,740, dated August 30, 1904.

Application filed December 10, 1900. Serial No. 39,298. (No model.)

*To all whom it may concern:*

Be it known that I, JOHN W. FLETCHER, a citizen of the United States, and a resident of Chicago, Cook county, Illinois, have invented certain new and useful Improvements in a Combined Square, Bevel, Leveling and Plumbing Instrument; and I do hereby declare that the following is a full, clear, and exact description thereof, reference being had to the accompanying drawings, and to the letters of reference marked thereon, which form a part of this specification.

This invention relates to improvements in testing apparatus of that class used in testing levels, verticals, and intermediate inclinations, and also for testing angles, and relates more particularly to a combined level, plumb, square, and bevel.

Heretofore in testing perpendiculars plumb-lines have sometimes been used, which are always more or less affected by the wind, and spirit-levels provided with a plumb-vial and perhaps a battering-vial. These are frequently inaccurate, owing to the testing-vial being jarred out of position or the absorption or evaporation of the liquid. This defect may not be discovered until serious and expensive mistakes have been made. If a battering-vial is provided on such a level, it is difficult of adjustment and when adjusted can be used for but one inclination without readjustment. It is frequently desirable that a testing or plumbing implement have secured thereon means for testing angles, as in setting door and window frames.

A testing implement embodying my invention is cheap, accurate, greatly economizes the time of the user, and provides a construction not likely to get out of order.

The invention consists of the matters hereinafter described, and more fully pointed out and defined in the appended claims.

In the drawings, Figure 1 is a side elevation of a device embodying my invention. Fig. 2 is a similar side elevation showing the square and bevel closed. Fig. 3 is a fragmentary side elevation with one of the plates removed. Fig. 4 is a vertical section of Fig. 3. Figs. 5, 6, 7, and 8 are fragmentary details illustrating features of construction of the combined square and bevel forming part of my invention.

As shown in the drawings, A indicates a straight-edge of any desired length, width, and thickness, provided centrally with an aperture extending therethrough, as indicated in Figs. 1, 3, and 4.

$a\ a$ indicate plates of sheet metal rigidly secured on opposite sides of said straight-edge and covering said apertures. Each of said plates is provided with bearings $a'$, concentric with said aperture. A weighted indicator comprising a rotary plumb-bob B is rigidly secured upon an axle $b$, journaled at its ends in said bearings $a'\ a'$ within said aperture and a needle extending from said plumb-bob on the opposite side of the shaft $b$. Said plumb-bob is unequally balanced on said shaft, the part opposite the needle being relatively thick and heavy, thereby acting at all times to hold the needle vertically when the instrument is placed upon the edge or end. Said plates $a\ a$ are each provided with segment-shaped apertures arranged in a semicircle concentric with the bearings $a'$, as indicated in Figs. 1 and 2, and through which the needle-point on the plumb may readily be seen when the instrument is in use. Said plates are provided with a carefully-graduated scale visible on either side of the straight-edge and indicating horizontals, perpendiculars, and intermediate inclinations, as indicated in Figs. 1 and 2. If preferred, plates of glass or other transparent material (indicated by $b^2\ b^2$ in Fig. 4) may be inserted in the straight-edge beneath said plate, acting to prevent dust or dirt finding its way through said apertures into the instrument, and, if preferred, the same may be provided with a graduated scale similar to that before described. If said transparent plates $b^2\ b^2$ is not used, or in the event of dust finding its way through said apertures because said transparent plates have been broken or removed, it is desirable to provide means for permitting the escape of such dirt or other foreign matter from the apparatus, and for this purpose the aperture in the straight-edge is continued longitudinally to a point beyond the plate *a*, obviously permitting any foreign matter to fall therefrom.

As a further improvement I have provided additional means for testing and defining angles and convertible into a square or bevel at will, comprising a straight-edge blade C, preferably of metal, graduated in inches and fractions thereof on the edges of the same and pivoted at one end on the end of the straight-edge A which is uppermost when used in determining verticals and adapted to swing thereon in either direction. Said plate is slotted longitudinally from a point near its center to near said pivoted end, and a blade C' is pivoted on said straight-edge A by means of the bolt $c^4$ at a point beneath the pivot of the blade C and slotted from near its outer end to a point adjacent to the edge of said straight-edge A. The outer ends of said blades are connected by means of a flat-headed bolt *c*, which is passed through the slots in both of said plates and is provided with a winged nut *c'*, which acts to bind the same rigidly together in any adjusted position, as indicated in Figs. 1 and 7. Said blade C' may be graduated on the edges and sides to indicate the point at which the blade C should be secured to indicate a desired angle. The blade C may also, if preferred, be provided with a notch on the upper side of the slot adapted to receive the bolt *c* when the blade C is at a right angle with the straight-edge A. The bolt *c* is provided with an angular part fitting in said slots and acting to hold the bolt from turning. When the blades are not in use, the bolt *c* is removed and the nut $c^2$ and the bolt $c^4$ are changed to the aperture $c^3$ in the straight-edge and the blades are placed in the position indicated in Fig. 2 and rigidly secured in such position by means of the winged nut $c^2$. If preferred, the blades may be made to swing in the opposite direction and fold in a suitable slot in the edge of the straight-edge, as indicated in Fig. 8.

As a further improvement I have provided a spring-controlled push-pin D, seated in the edge of the straight-edge and adapted to rest upon the edge of the board or other object being operated upon when the device is used as a square or bevel horizontally, but readily pushed back into the straight-edge when the device is used for plumbing. I have also provided means for detecting any inaccuracy of adjustment in the beveling or plumbing device, which I term a "telltale," and which consists in providing a segment-shaped recess in the edges of the plates *a a* and a central point extending from the plate into said recess. The lower end of the plumb-bob is provided with a needle or indicator which registers with said point when the needle *b'* indicates the perpendicular, as indicated in Fig. 1, thereby infallibly indicating any imperfection or defect in the adjustment of said needle *b'* to indicate correctly the scale.

The operation of a device embodying my invention is as follows: When the straight-edge is placed edge down, the needle *b'* swings to the position indicated in Fig. 3 and indicates level or the angle of inclination from horizontal on said scale. When the straight-edge is held vertically, as indicated in Figs. 1 and 2, the needle may also be seen through the aperture and will indicate a vertical position on said scale, and any angle of inclination therefrom will be correctly indicated on said scale, thereby providing an instrument not only for leveling and plumbing, but also peculiarly adapted for use in testing levels and for use in bridge-building or other work where the parts are inclined at definite angles from the perpendicular, or, in other words, batter. The blades C and C' are particularly useful in setting window and door frames and for other purposes when it is desired to test the angularity of openings with respect to the perpendicular or horizontal. Obviously many details of construction may be varied from those herein shown without departing from the principle of my invention.

I claim as my invention—

1. In a device of the class described the combination with a straight-edge provided with an aperture therethrough, apertured graduated plates covering the aperture in said straight-edge, a gravity-operated indicator adapted to indicate horizontals, verticals and inclinations intermediate thereof, graduated arms pivotally connected adjacent to one end of said straight-edge, slidably adjustable with respect to each other and adapted to be folded on and rigidly secured to the straight-edge when not in use.

2. In a device of the class described the combination with an apertured straight-edge, of plates covering said aperture, graduated apertures therein concentric with the aperture in the straight-edge, a weighted needle pivoted axially in said aperture and adapted to indicate levels, verticals and intermediate inclinations, a transparent closing-plate beneath said apertured plates, an opening communicating with said aperture, a graduated arm pivoted at one end of said straight-edge, a second graduated arm pivoted to said straight-edge and to the aforesaid graduated arm and means for rigidly securing said arm in its adjusted position with respect to said straight-edge.

In witness whereof I have hereunto subscribed my name in the presence of two subscribing witnesses.

JOHN W. FLETCHER.

Witnesses:
CHARLES W. HILLS,
NAFTALY NEWMAN.